United States Patent
Tian et al.

(10) Patent No.: US 10,580,146 B2
(45) Date of Patent: Mar. 3, 2020

(54) METHOD AND SYSTEM FOR TRACKING AN OBJECT OF INTEREST IN A TALKGROUP

(71) Applicant: MOTOROLA SOLUTIONS, INC., Chicago, IL (US)

(72) Inventors: Yong Tian, Sichuan (CN); Dajun Chen, Sichuan (CN); Xun Fei, Sichuan (CN); Dong Zhao, Sichuan (CN); Kangkai Zhao, Sichuan (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/465,340

(22) PCT Filed: Dec. 22, 2016

(86) PCT No.: PCT/CN2016/111434
§ 371 (c)(1),
(2) Date: May 30, 2019

(87) PCT Pub. No.: WO2018/112820
PCT Pub. Date: Jun. 28, 2018

(65) Prior Publication Data
US 2019/0392592 A1    Dec. 26, 2019

(51) Int. Cl.
*G06T 7/292* (2017.01)
*H04M 3/56* (2006.01)
(Continued)

(52) U.S. Cl.
CPC .......... *G06T 7/292* (2017.01); *G06K 9/00362* (2013.01); *H04M 3/42348* (2013.01);
(Continued)

(58) Field of Classification Search
CPC ............. H04M 3/42348; H04M 3/567; H04M 2203/2044; H04M 2203/359;
(Continued)

(56) References Cited

U.S. PATENT DOCUMENTS

| 8,400,548 B2 | 3/2013 | Bilbrey et al. |
| 9,020,832 B2 * | 4/2015 | Fisher .................... G06Q 30/02 705/14.1 |

(Continued)

FOREIGN PATENT DOCUMENTS

| CN | 103080951 | 5/2013 |
| CN | 103329146 | 9/2013 |

(Continued)

OTHER PUBLICATIONS

PCT/CN2016/111434 International Search Report and Written Opinion of the International Searching Authority dated Sep. 13, 2017 (8 pages).

*Primary Examiner* — Katrina R Fujita
(74) *Attorney, Agent, or Firm* — Michael Best & Friedrich LLP

(57) ABSTRACT

A method and system for tracking an object of interest in a talkgroup. The method includes receiving a first image stream including the object from a first portable communication device associated with the talkgroup. The method includes detecting the object in the first image stream, determining a first view angle associated with the object's position in relation to the first device, and determining a second view angle associated with the object's position in relation to a second portable communication device. When a difference between the first angle and the second angle is below a threshold, a first modified image stream is generated by highlighting the object in the first image stream. When the difference between the first angle and the second angle is above the threshold, a second modified image stream is generated by highlighting the object and indicating a relative direction to the object from the second device.

20 Claims, 6 Drawing Sheets

(51) Int. Cl.
*G06K 9/00* (2006.01)
*H04M 3/42* (2006.01)
*H04W 4/08* (2009.01)
*H04W 64/00* (2009.01)

(52) U.S. Cl.
CPC ............ *H04M 3/567* (2013.01); *H04W 4/08* (2013.01); *H04W 64/00* (2013.01); *G06T 2207/30196* (2013.01); *H04M 2203/2044* (2013.01); *H04M 2203/359* (2013.01); *H04M 2242/30* (2013.01)

(58) Field of Classification Search
CPC ... H04M 2242/30; H04W 4/08; H04W 64/00; G06T 7/292; G06T 2207/30196; G06K 9/00362
See application file for complete search history.

(56) References Cited

U.S. PATENT DOCUMENTS

| | | | | |
|---|---|---|---|---|
| 9,031,543 | B2* | 5/2015 | Lee | H04W 64/006 455/416 |
| 9,041,766 | B1 | 5/2015 | Gates et al. | |
| 9,229,955 | B2* | 1/2016 | Salminen | G06K 9/00295 |
| 9,875,719 | B2* | 1/2018 | Eckhoff | G06Q 30/02 |
| 10,078,899 | B2* | 9/2018 | Oh | H04N 5/23296 |
| 2006/0223518 | A1* | 10/2006 | Haney | H04W 4/21 455/420 |
| 2008/0055395 | A1* | 3/2008 | Mock | G06Q 20/3224 348/14.01 |
| 2010/0069035 | A1* | 3/2010 | Johnson | H04W 92/18 455/404.1 |
| 2013/0100306 | A1 | 4/2013 | Bekiares et al. | |
| 2014/0320529 | A1 | 10/2014 | Roberts et al. | |
| 2014/0375683 | A1 | 12/2014 | Salter et al. | |
| 2014/0375982 | A1* | 12/2014 | Jovicic | G01B 11/14 356/72 |
| 2016/0027218 | A1 | 1/2016 | Salter et al. | |
| 2017/0099455 | A1* | 4/2017 | Mazzarella | H04W 4/90 |
| 2017/0294131 | A1* | 10/2017 | Jedrzejewski | H04W 4/027 |
| 2018/0376294 | A1* | 12/2018 | Tian | G07G 1/14 |

FOREIGN PATENT DOCUMENTS

| | | |
|---|---|---|
| CN | 104463899 | 3/2015 |
| CN | 105574847 | 5/2016 |

* cited by examiner

METHOD AND SYSTEM FOR TRACKING AN OBJECT OF INTEREST IN A TALKGROUP

BACKGROUND OF THE INVENTION

Public safety communication systems are often organized into groups (for example, talkgroups). Some communications systems area capable of transmitting and receiving images and video streams to and from emergency responders and other public safety personnel to provide realistic simulated images of the real-world environment in which they operate. Groups of emergency responders, using such systems, may be dispatched for the same mission or may be interested in similar objects or persons. The emergency responders may use virtual reality and augmented reality systems to increase their visual capabilities. During a response effort, where multiple emergency responders pursue an object of interest (for example, police officers pursuing a criminal suspect), the responders may each have different virtual reality or augmented reality feeds having different angles of view, depending on the relative position of the responder to the object of interest.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
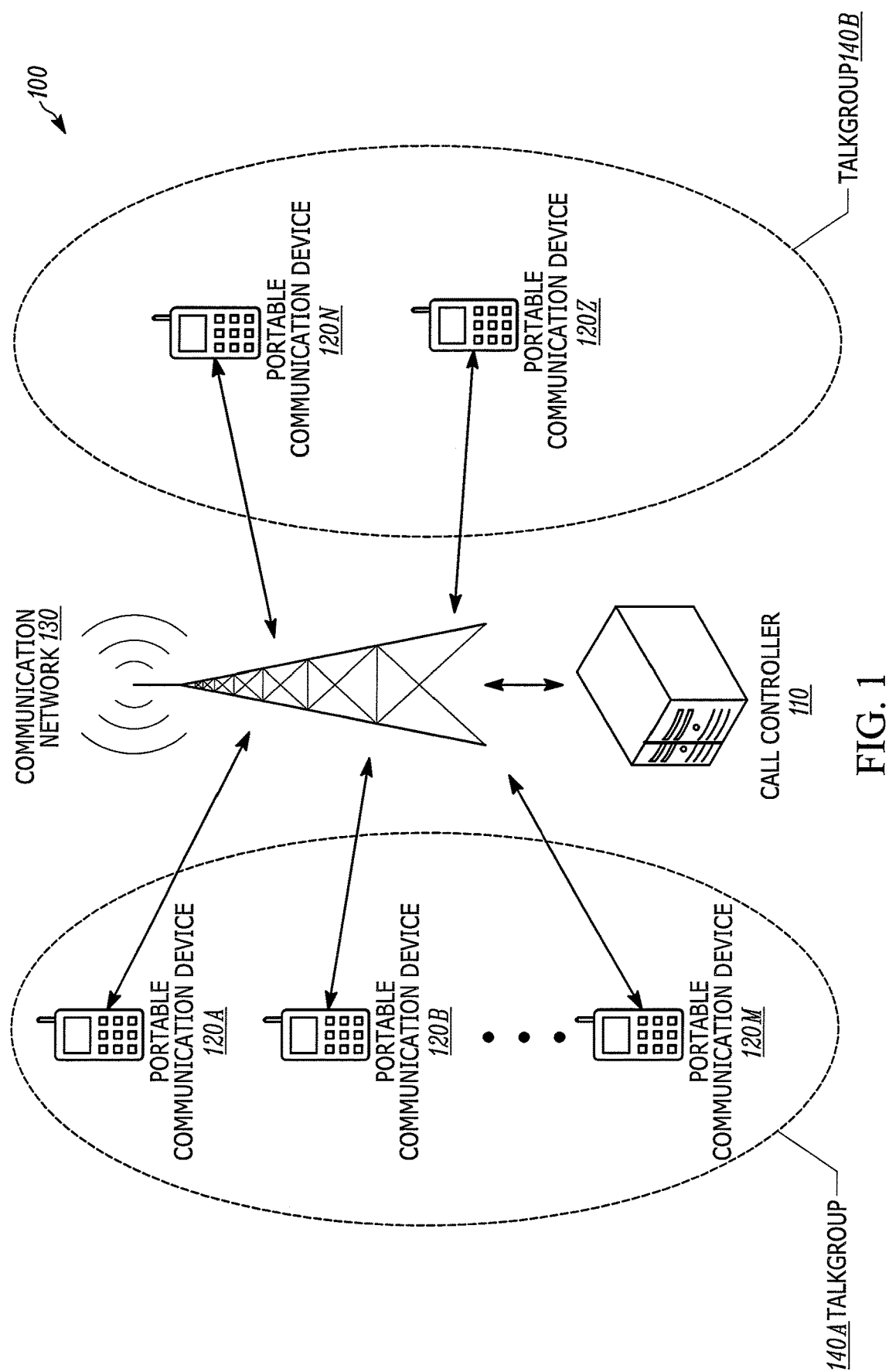
FIG. 1 is a diagram of a system for tracking an object of interest in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Virtual reality and augmented reality systems may be used by emergency responders to provide realistic simulated images of the real-world environment in which they operate. When emergency responders in a talkgroup share several images and video streams, it may be challenging for the emergency responders to stay focused on a particular object of interest. This is especially true when several of the images and video streams received from several emergency responders related to the object of interest have different angles of view. Using voice communication from the several emergency responders to clarify these different angles of view is not efficient and may lead to further confusion for members of the talkgroup.

Accordingly, methods and systems are provided herein for tracking an object of interest in a talkgroup.

One example embodiment provides a method for tracking an object of interest in a talkgroup. The method includes receiving, with an electronic processor, a first image stream including the object of interest from a first portable communication device associated with the talkgroup. The method also includes detecting the object of interest in the first image stream. The method also includes determining a first view angle associated with a position of the object of interest in relation to the first portable communication device. The method also includes determining a second view angle associated with a position of the object of interest in relation to a second portable communication device. The method also includes, when a difference between the first view angle and the second view angle is below a threshold, generating a first modified image stream by highlighting the object of interest in the first image stream. The method also includes, when the difference between the first view angle and the second view angle is above the threshold, generating a second modified image stream by highlighting the object of interest and indicating a relative direction to the object of interest from the second portable communication device.

Another example embodiment provides a system for tracking an object of interest in a talkgroup. The system includes a communication interface, a display, and an electronic processor coupled to the communication interface and the display. The electronic processor is configured to receive a first image stream including the object of interest from a first portable communication device associated with the talkgroup. The electronic processor is configured to detect the object of interest in the first image stream. The electronic processor is also configured to determine a first view angle associated with the position of the object of interest in relation to the first portable communication device. The electronic processor is also configured to determine a second view angle associated with the position of the object of interest in relation to a second portable communication device. The electronic processor is also configured to generate a first modified image stream by highlighting the object of interest in the first image stream when a difference between the first view angle and the second view angle is below a threshold. The electronic processor is also configured to generate a second modified image stream by highlighting the object of interest and indicating the relative direction to the object of interest from the second portable communication device when the difference between the first view angle and the second view angle is above the threshold.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

Figure 3:
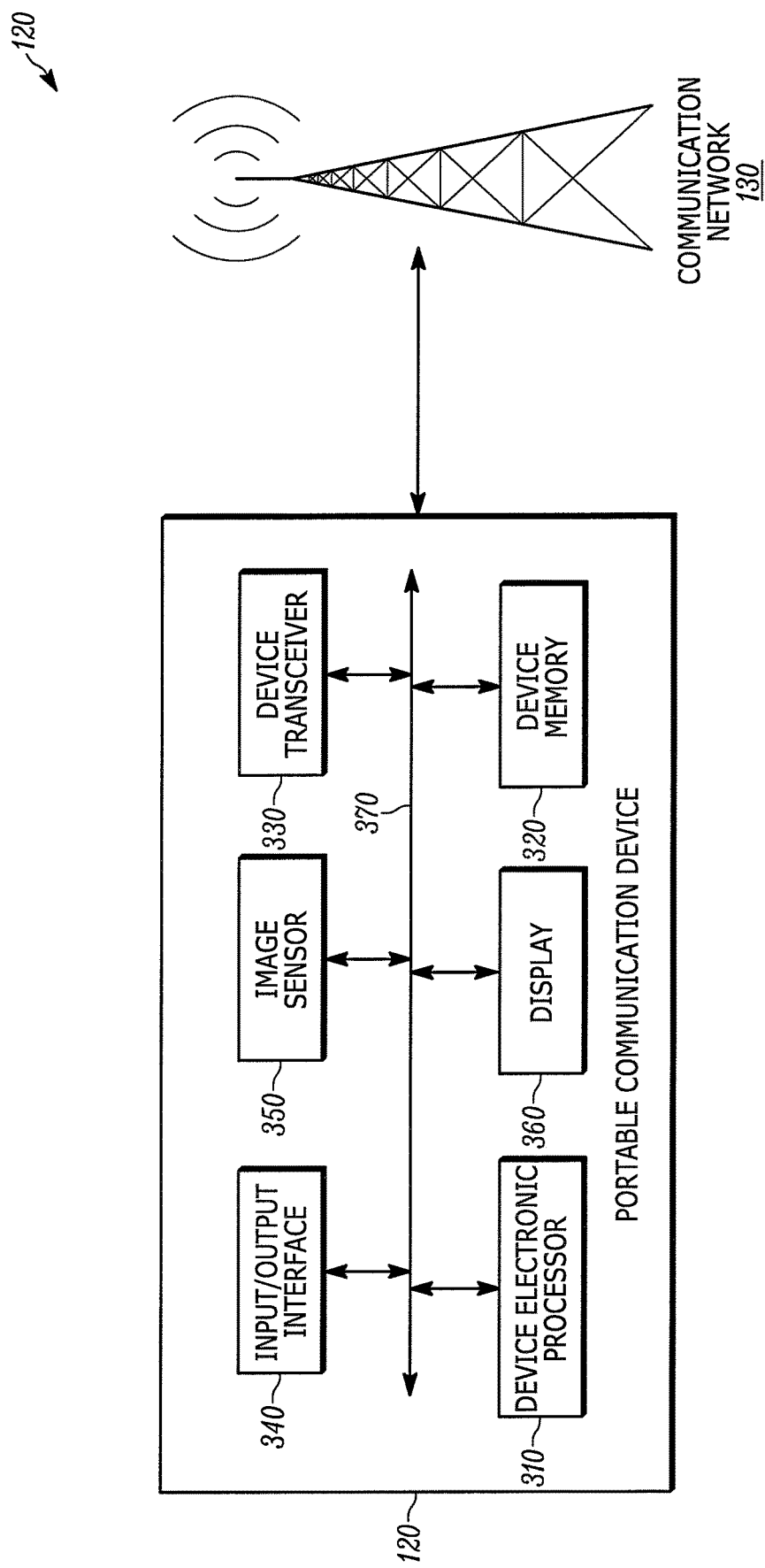
FIG. 3 is a diagram of a portable communications device in accordance with some embodiments.

FIG. 1 is a diagram of a system 100 for tracking an object of interest in a talkgroup. In the example illustrated, the system 100 includes a call controller 110. The call controller 110 may be, for example, a computer-aided dispatch terminal for a public safety organization. The call controller 110 communicates with a plurality of portable communication devices 120A through 120Z via a communication network 130. On a singular basis, one of the portable communication devices 120A through 120Z may be referred to herein as a portable communication device 120. Each of the portable communication devices 120A through 120Z may be, for example, a portable two-way radio including a camera, a body-worn camera device, a smart telephone, a tablet computer, and the like. The portable communication devices 120A through 120Z are presented as examples that may be programmed and configured to carry out the functions described herein. The portable communication device 120, described more particularly below with respect to FIG. 3, is a wireless communication device that includes hardware and software that enable it to communicate via the network 130. The portable communication device 120 includes an image sensor (for example, a camera), and is capable of capturing, storing, analyzing, displaying, and transmitting captured images of an incident scene or an object of interest. The portable communication device 120 operates using, among other things, augmented reality technology, where live images are captured by the image capture device and display (for example, on a screen) with text, graphics, or graphical user interface elements superimposed on or otherwise combined with the live images. As described in detail below, the superimposed text or graphics may be used to record or convey information about the object of interest. The object of interest may be any object, which is involved in or relevant to an investigation or other public safety operation (for example, responding to a crime, searching for a suspect, or locating a missing person). Objects of interest may include, for example, persons (for example, in the case of a criminal hunt or investigation) or automobiles (for example, in the case of a traffic accident).

The communication network 130 may be a wired or wireless communication network, such as a cellular network, a land mobile radio (LMR) network, or a combination of both. Portions of the communication network 130 may be implemented using various wide area networks, for example the Internet, and local area networks, for example, a wireless local area network (for example, Wi-Fi).

In some embodiments, each portable communication device 120 may belong to one or more talkgroups 140 that a user of the portable communication device 120 may switch between. A talkgroup 140 is a virtual radio channel on a digital radio system that enables communication between members of the talkgroup 140. Each portable communication device 120 in a particular talkgroup 140 is assigned a talkgroup identifier, which allows the portable communication device 120 to send communications to the other portable communication devices 120 assigned the same talkgroup identifier, which communications are not received by devices not assigned the same talkgroup identifier. In the example illustrated, portable communication devices 120A through 120M belong to talkgroup 140A and portable communication devices 120N through 120Z belong to talkgroup 140B. For example, portable communication devices 120A through 120M that may be participating in an operation (for example, pursuing an object of interest) belong to the talkgroup 140A. During the operation, the talkgroup 140A allows users of the portable communication devices 120A through 120M to send communications to each other and the call controller 110 via the communication network 130. Portable communication devices 120 (and thus the users of the portable communication devices 120) can be assigned to multiple talkgroups 140. As used in this description, talkgroup 140 may include a traditional static or dynamic talkgroup, an incident area network including multiple talkgroups and equipment used by members of a personal area network, and the like.

FIG. 1 illustrates only one exemplary embodiment of a system 100. In other embodiments, the system 100 may include more or fewer components and may perform functions that are not explicitly described herein. In addition, although the call controller 110 is illustrated as communicating with all portable communication devices 120A through 120Z via a single communication network 130, the call controller 110 may communicate with the portable communication devices 120A through 120Z via multiple communication networks (constructed in accordance with various network protocols) and connections (for example, wired or wireless connections). Further, although the system 100 is shown as a centralized system, the system 100 may also be implemented as a decentralized system in which the functionality of the call controller 110 is accomplished within one or more of the portable communication devices 120, or on other controllers or servers (not shown).

Figure 2:
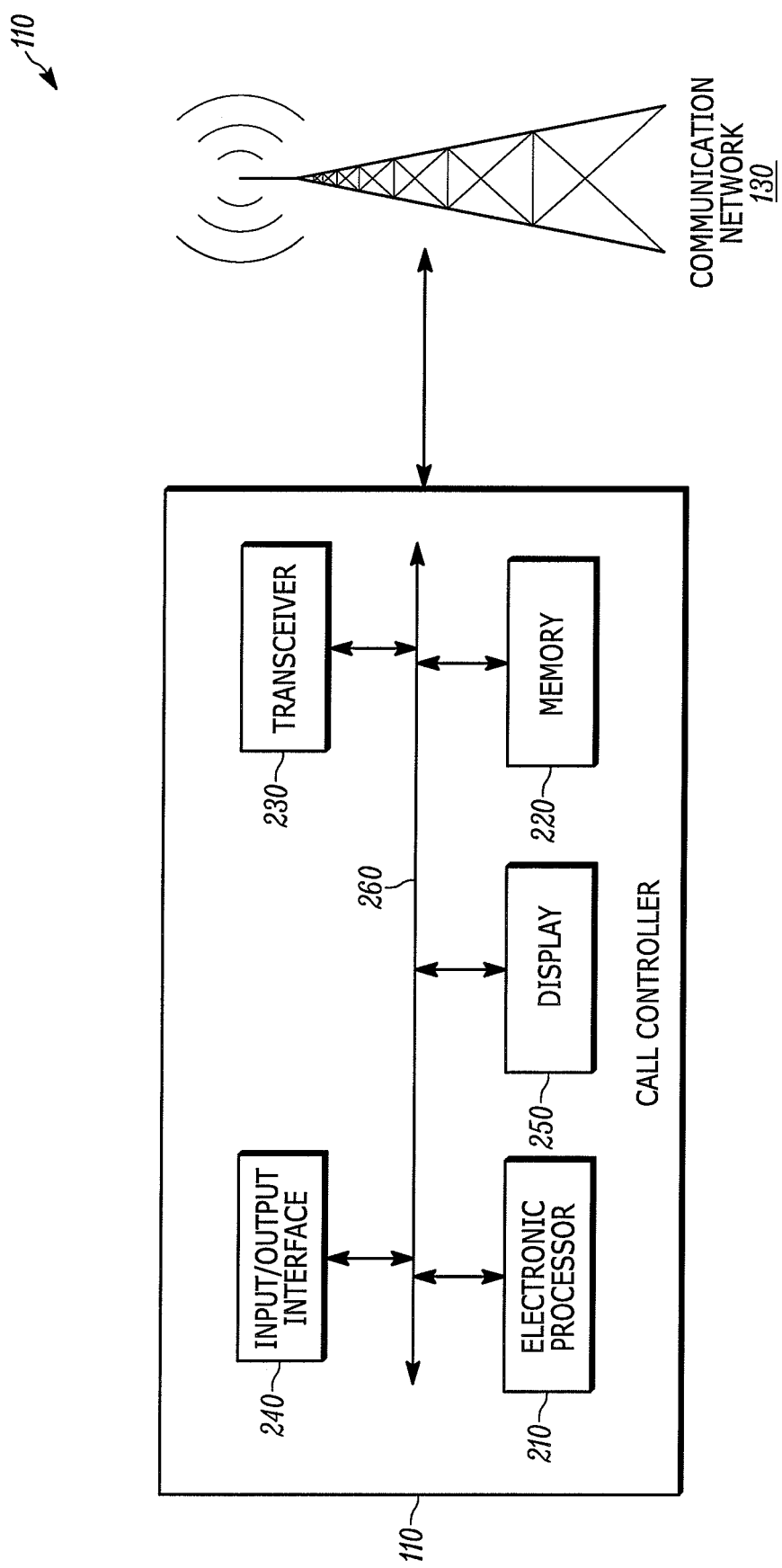
FIG. 2 is a diagram of a call controller in accordance with some embodiments.

FIG. 2 is a diagram of one embodiment of the call controller 110. In the example illustrated, the call controller 110 includes an electronic processor 210, a memory 220, a transceiver 230, an input/output interface 240, and a display 250. The electronic processor 210, the memory 220, the transceiver 230, the input/output interface 240, and the display 250 communicate over one or more control and/or data buses (for example, a communication bus 260). FIG. 2 illustrates only one exemplary embodiment of a call controller 110. The call controller 110 may include more or fewer components and may perform functions other than those explicitly described herein.

In some embodiments, the electronic processor 210 is implemented as a microprocessor with separate memory, such as the memory 220. In other embodiments, the electronic processor 210 may be implemented as a microcontroller (for example, with the memory 220 on the same chip). In other embodiments, the electronic processor 210 may be implemented using multiple processors. In addition, the electronic processor 210 may be implemented partially or entirely as, for example, a field-programmable gate array (FPGA), and application specific integrated circuit (ASIC), and the like and the memory 220 may not be needed or may be modified accordingly. In the example illustrated, the memory 220 includes non-transitory, computer-readable memory that stores instructions that are received and executed by the electronic processor 210 to carry out functionality of the call controller 110 described herein. The memory 220 may include, for example, a program storage area and a data storage area. The program storage area and the data storage area may include combinations of different types of memory, such as read-only memory and random-access memory.

The transceiver 230 enables wireless communication from the call controller 110 to, for example, the portable communication devices 120A through 120Z via the communication network 130. In other embodiments, rather than the transceiver 230, the call controller 110 may include separate transmitting and receiving components, for example, a transmitter and a receiver. In other embodiments, the call controller 110 may not include a transceiver 230 and may communicate with the portable communication devices 120A through 120Z via a network interface and a wired connection to the communication network 130.

As noted above, the call controller 110 may include the input/output interface 240. The input/output interface 240 may include one or more input mechanisms (for example, a touch screen, a keypad, a button, a knob, and the like), one or more output mechanisms (for example, a display, a printer, a speaker, and the like), or a combination thereof. The input/output interface 240 receives input from input devices actuated by a user, and provides output to output devices with which a user interacts. In some embodiments, as an alternative or in addition to managing inputs and outputs through the input/output interface 240, the call controller 110 may receive user input, provide user output, or both by communicating with an external device, such as a console computer, over a wired or wireless connection.

The display 250 is a suitable display such as, for example, a liquid crystal display (LCD) screen. The call controller 110 may implement a graphical user interface (GUI) (for example, generated by the electronic processor 210, from instructions and data stored in the memory 220, and presented on the display 250), that enables a user to interact with the call controller 110.

FIG. 3 is a diagram of one embodiment of a portable communication device 120. In the example illustrated, the portable communication device 120 includes, among other things, a device electronic processor 310, a device memory 320, a device transceiver 330, a device input/output interface 340, an image sensor 350, and a device display 360. The device electronic processor 310, the device memory 320, the device transceiver 330, the device input/output interface 340, the image sensor 350 and the device display 360 that communicate over one or more control and/or data buses (for example, a device communication bus 370). FIG. 3 illustrates only one exemplary embodiment of the portable communication device 120. The portable communication device 120 may include more or fewer components than illustrated and may perform additional functions other than those described herein. In some embodiments, components of the portable communication device 120 may be separately implemented, and may be communicatively coupled by a bus or by a suitable communication network. For example, the portable communication device 120 may include a dash camera in a vehicle coupled to a mobile two-way radio, a network-connected portable computer, or similar device in or coupled to the vehicle.

The device electronic processor 310 may be implemented in various ways including ways that are similar to those described above with respect to the electronic processor 210. Likewise, the device memory 320 may be implemented in various ways including ways that are similar to those described with the respect to the memory 220. The device memory 320 may store instructions that are received and executed by the device electronic processor 310 to carry out the functionality described herein.

The device transceiver 330 enables wireless communication from the portable communication device 120 to, for example, the call controller 110 and other portable communication devices via the communication network 130. In other embodiments, rather than a device transceiver 330, the portable communication device 120 may include separate transmitting and receiving components, for example, a transmitter and a receiver.

The device input/output interface 340 may include one or more input mechanisms (for example, a touch screen, a keypad, a button, a knob, and the like), one or more output mechanisms (for example, a display, a speaker, and the like), or a combination thereof. In some embodiments, the communications device 120 communicates with one or more external devices that may be part of a personal area network (PAN) of devices.

The image sensor 350 is an image capture device for capturing images, including a portion or the entire incident scene, by, for example, sensing light in at least the visible spectrum. The image sensor 350 communicates the captured images to the device electronic processor 310 via the input/output interface 340. It should be noted that the terms "image" and "images," as used herein, may refer to one or more digital images captured by the image sensor 350, or processed by the device electronic processor 310, or displayed on the device display 360. Further, the terms "image" and "images," as used herein, may refer to still images or sequences of images (that is, video). In one example, the image sensor 350 is integrated into the portable communication device 120. In alternative embodiments, the image sensor 350 is separate from the portable communication device 120, and communicates captured images to the portable communication device 120 via a wired or wireless connection. For example, the image sensor 350 may be integrated into a body-worn camera, which communicates with the portable communication device 120.

The device display 360 is a suitable display such as, for example, a liquid crystal display (LCD) touch screen, or an organic light-emitting diode (OLED) touch screen. The portable communication device 120 implements a graphical user interface (GUI) (for example, generated by the device electronic processor 310, from instructions and data stored in the device memory 320, and presented on the device display 360), that enables a user to interact with the portable communication device 120. In some embodiments, the portable communication device 120 operates or is integrated with a head-mounted display (HMD) or an optical head-mounted display (OHMD).

Figure 4:
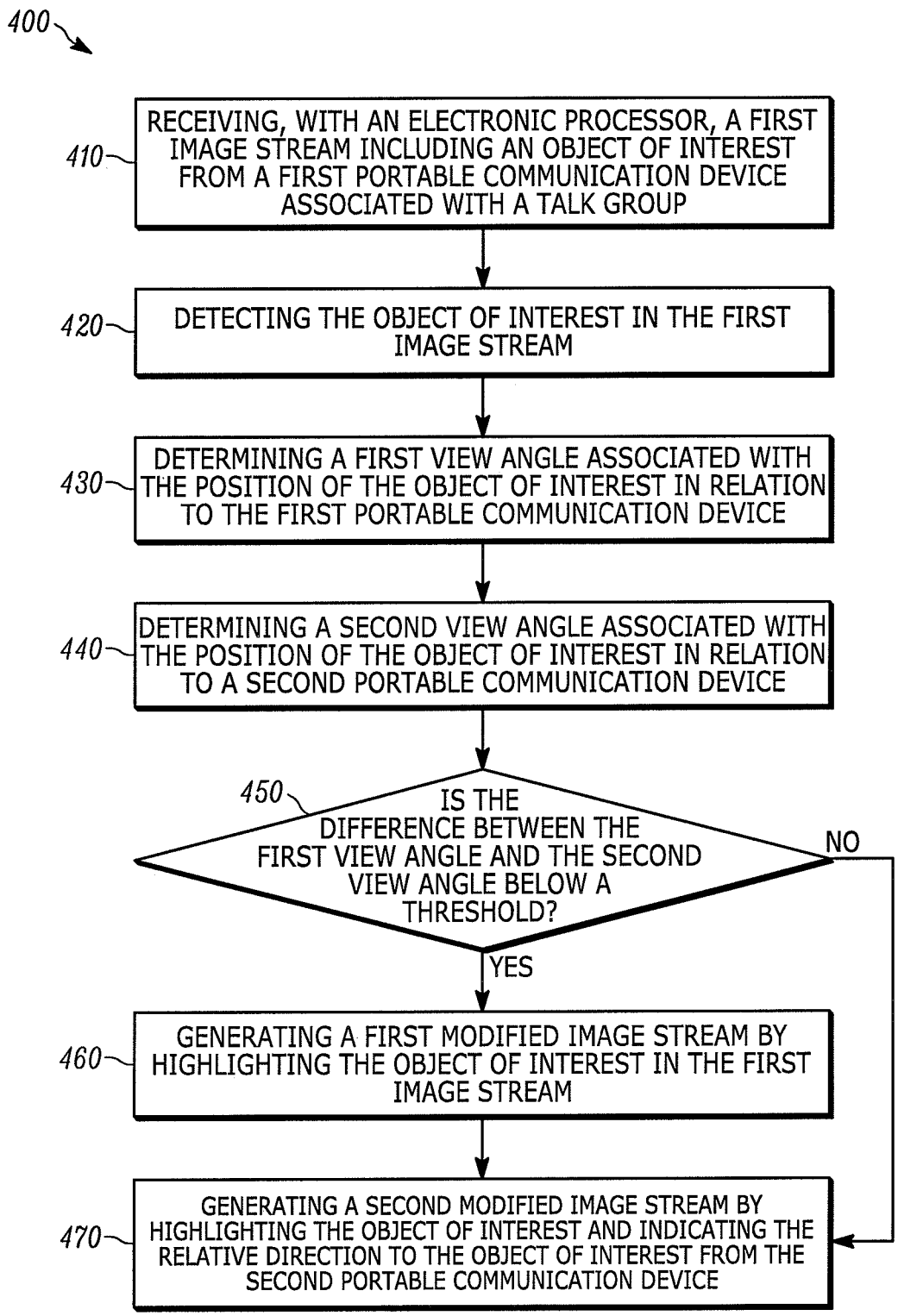
FIG. 4 is a flowchart of a method for tracking an object of interest in accordance with some embodiments.
Figure 5:
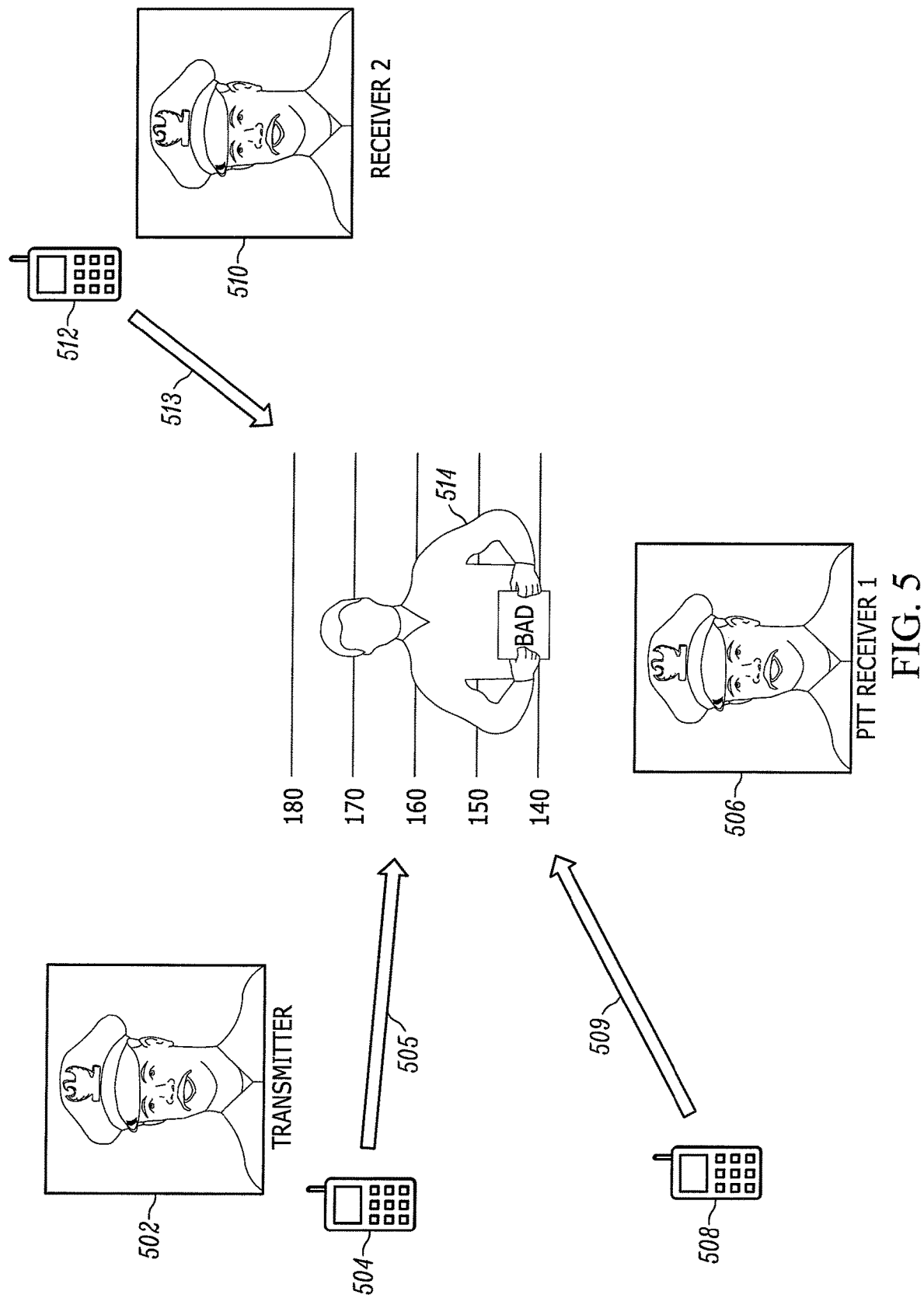
FIG. 5 illustrates an object of interest viewed from different angles based on the position of the portable communication device with respect to the object of interest, in accordance with some embodiments.

FIG. 4 is a flowchart of a method 400 for tracking an object of interest in accordance with some embodiments. As an example, the method 400 is explained in terms of the call controller 110 receiving video streams from portable communication devices within a talkgroup 140A or 140B of FIG. 1. In one example, the video stream is associated with a virtual reality image stream. In another example, the video stream is associated with an augmented reality image stream. The method 400 is described with respect to FIG. 5, which illustrates the object of interest being viewed from different view angles based on the position of the portable communication devices 504, 508, and 512 with respect to the object of interest 514. The portable communication devices 504, 508 and 512 are associated with emergency responders 502, 506 and 510, respectively. Also illustrated in FIG. 5 are view angles 505, 509, and 513. The view angle 505 is the angular extent of the object of interest 514 that is imaged by the image sensor of the portable communication device 504. The view angle 509 is the angular extent of the object of interest 514 that is imaged by the image sensor of the portable communication device 508. The view angle 513 is the angular extent of the object of interest 514 that is imaged by the image sensor of the portable communication device 512. In one example, each of the portable communication devices 504, 508, 512 is configured to generate a video stream associated with its corresponding view angle and also receive one or more video streams generated by the remaining portable communication devices within the talkgroup it belongs to. In one embodiment, a video stream including the object of interest 514 may be generated at the portable communication device 504 that is associated with the emergency responder 502 and transmitted to the portable communication device 508 and the portable communication device 512, via the call controller 110, based on their relative location from object of interest 514. In some embodiments, the call controller 110 is configured to modify the video stream based on either the presence or absence of the object of interest 514. In one example, when the object of interest 514 is present in a video stream, a direction guide may be superimposed or included to generate a modified video stream. In another example, when the object of interest 514 is not available in the video stream, a virtual object of interest and a direction guide may be superimposed or included to generate a modified video stream.

At block 410, the electronic processor 210 receives a first image stream including an object of interest 514 (for example, an image of a criminal suspect) from a portable communication device (for example, portable communication device 504) associated with a talk group including portable communication devices 504, 508 and 512. At block 420, the method 400 includes detecting the object of interest 514 in the first image stream received at block 410. For example, the electronic processor 210 may detect the object of interest by detecting a visual focus within the first image stream.

At blocks 430 and 440, the electronic processor 210 determines the view angle 505 associated with the portable communication device 504, the view angle 509 associated with the portable communication device 508, and the view angle 513 associated with the portable communication device 512. In some embodiments, the view angle may be determined using the location of one or more of the portable communication devices 504, 508, and 512. In some embodiments, the view angle may be determined by analyzing the images in the video stream using a range imaging technique (for example, stereo triangulation).

At block 450, the electronic processor 210 determines whether the difference between the view angle 505 and the view angle 509 is below a threshold angle. When the difference between the first view angle 505 and the second view angle 509 is below a threshold angle, the method 400 proceeds to block 460. When the difference between the first view angle 505 and the second view angle 509 is above the threshold angle, the method 400 proceeds to block 470. The electronic processor 210 may also determine whether the view angle 505 and view angle 509 are substantially different (for example, above a particular threshold angle) or substantially similar (for example, below a particular threshold angle). In one example, when the difference between the view angle 505 and the view angle 509 is below a threshold angle, the video stream received from 504 may be modified to show the object of interest as being highlighted. In another example, when a difference between the view angle 505 and the view angle 509 is above a threshold angle, the video stream received from 504 may be modified to show the object of interest as being highlighted along with an indication of the relative direction of the object of interest 514 from the personal communication device 508.

At block 460, the electronic processor 210 generates a first modified image stream by highlighting the object of interest 514 in the first image stream. At block 470, the method 400 includes generating a second modified image stream by highlighting the object of interest 514 and indicating the relative direction of the object of interest 514 to the portable communication device 508. At block 470, the method 400 further includes generating a first visual cue indicating the relative position of the object of interest 514 in relation to the portable communication device 508. At block 470, the method 400 further includes superimposing the first cue onto the second modified image stream. In one embodiment, superimposing the virtual object of interest on the second image stream is based on a location of the portable communication device 504 and a location of the portable communication device 508. In some embodiments, the method 400 includes transmitting the second modified image stream to the portable communication device 508.

Figure 6:
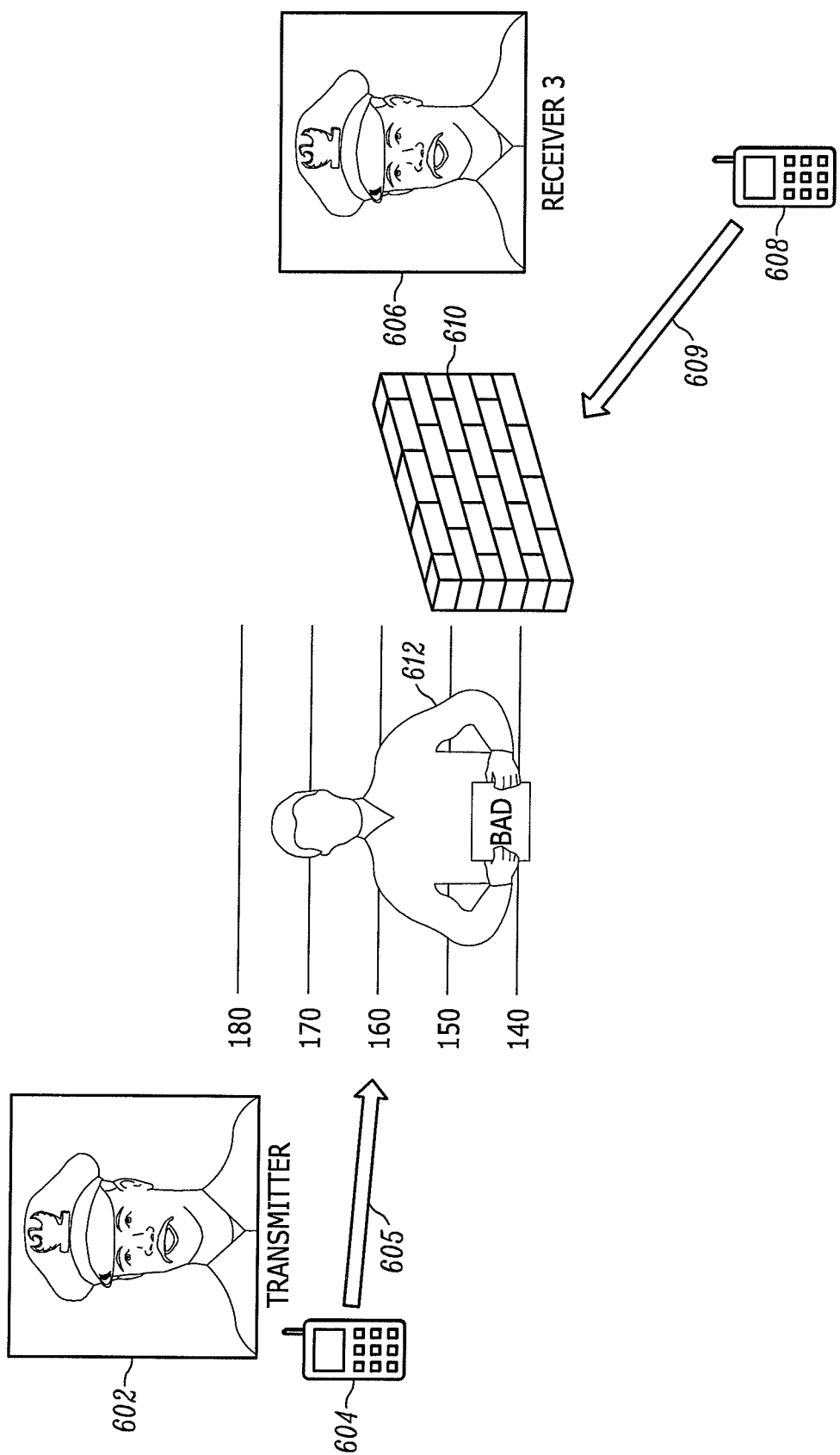
FIG. 6 illustrates an object of interest viewed from different angles based on the position of the portable communication device and an obstacle between the portable communication device and the object of interest, in accordance with some embodiments.

FIG. 6 illustrates an object of interest 612 viewed from different angles based on the position of the portable communication devices 604, 608 and an obstacle 610 between the portable communication device 608 and the object of interest 612, in accordance with some embodiments. The portable communication devices 604 and 608 are associated with emergency responders 602 and 606, respectively. Also illustrated in FIG. 6 are view angles 605 and 609. The view angle 605 is associated with the position of the portable communication device 604 in relation to the object of interest 612. The view angle 609 is associated with the position of the portable communication device 608 in relation to the object of interest 612. In the arrangement shown in FIG. 6, the object of interest 612 is captured by the portable communication device 604 and communicated to portable communication device 608 via a communication network 130 and the call controller 110 (shown in FIG. 1).

In one example, when the object of interest is not detectable within an image stream (for example, the image stream generated by portable communication device 608 in FIG. 6), the electronic processor 210 generates a virtual object of interest based on the object of interest 612 seen by portable communication device 604 and superimposes or includes the virtual object of interest on the image stream generated at portable communication device 608. In one example, a direction guide indicating either or both of the view angles 605 and 609 is also superimposed or included on the image stream generated at portable communication device 608. In one example, the portable communication device 604 is configured to show the video stream presented on portable communication device 608. In one embodiment, when the object of interest 612 is moving away from a portable communication device 604, the electronic processor 210 generates one or more visual cues indicating the relative direction and speed of the object of interest 612 with respect to a portable communication device 608 that receives a modified video stream including the generated one or more video streams. In some embodiments, the electronic processor 210 adjusts the first visual cue based on a location of the portable communication device 608. In some embodiments, the electronic processor 210 simulates movement of the virtual object of interest based on parameters, namely, a change in the location of the portable communication device 604, a change in the location of the portable communication device 608, or both. For example, the electronic processor 210 may repeatedly superimpose on and remove from the second modified image stream the virtual object of interest to simulate movement through the environment captured in the second image stream.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for tracking an object of interest in a talkgroup, the method comprising:
receiving, with an electronic processor, a first image stream including the object of interest from a first portable communication device associated with a talkgroup;
detecting the object of interest in the first image stream;
determining a first view angle associated with a position of the object of interest in relation to the first portable communication device;
determining a second view angle associated with a position of the object of interest in relation to a second portable communication device;
when a difference between the first view angle and the second view angle is below a threshold, generating a first modified image stream by highlighting the object of interest in the first image stream; and
when the difference between the first view angle and the second view angle is above the threshold, generating a second modified image stream by highlighting the object of interest and indicating a relative direction to the object of interest from the second portable communication device.

2. The method of claim 1, further comprising transmitting, to the second portable communication device, the first modified image stream.

3. The method of claim 1, further comprising:
when the difference between the first view angle and the second view angle is above the threshold,
generating a first visual cue indicating a relative position of the object of interest in relation to the second portable communication device.

4. The method of claim 3, wherein generating the second modified image stream includes superimposing the first visual cue onto the second modified image stream.

5. The method of claim 1, further comprising, when the object of interest is no longer detectable in the first image stream,
generating a second modified image stream including a virtual object of interest and a direction guide indicating a third view angle; and
superimposing the virtual object of interest and the direction guide on a second image stream.

6. The method of claim 5, wherein superimposing the virtual object of interest on the second modified image stream includes superimposing the virtual object of interest on the second image stream based on a location of the first portable communication device and a location of the second portable communication device.

7. The method of claim 6, further comprising:
simulating movement of the virtual object of interest based on at least one selected from a group consisting of a change in the location of the first portable communication device and a change in the location of the second portable communication device.

8. The method of claim 1, further comprising, when the object of interest is no longer available within a third image stream generated at the second portable communication device,
generating a virtual object of interest based on the object of interest highlighted in the second modified image stream;
generating a direction guide indicating the second view angle; and
superimposing the virtual object of interest and the direction guide onto the third image stream.

9. The method of claim 1, wherein detecting the object of interest includes detecting a visual focus within the first image stream.

10. The method of claim 1, further comprising displaying the first modified image stream and the second modified image stream on at least one selected from a group consisting of a computer-aided dispatch terminal, a portable two-way radio, a body-worn camera device, a smart telephone, and a tablet computer.

11. A system for tracking an object of interest, the system comprising:
a communication interface;
a display; and
an electronic processor coupled to the communication interface and the display, and configured to
receive a first image stream including the object of interest from a first portable communication device associated with a talkgroup,
detect the object of interest in the first image stream,
determine a first view angle associated with a position of the object of interest in relation to the first portable communication device,
determine a second view angle associated with a position of the object of interest in relation to a second portable communication device,
generate a first modified image stream by highlighting the object of interest in the first image stream when a difference between the first view angle and the second view angle is below a threshold, and
generate a second modified image stream by highlighting the object of interest and indicating a relative direction to the object of interest from the second portable communication device when the difference between the first view angle and the second view angle is above the threshold.

12. The system of claim 11, wherein the electronic processor is further configured to
transmit the second modified image stream to the second portable communication device.

13. The system of claim 11, wherein the electronic processor is further configured to
generate a first visual cue indicating a relative position of the object of interest in relation to the second portable communication device when the difference between the first view angle and the second view angle is above the threshold.

14. The system of claim 13, wherein the electronic processor is further configured to
superimpose the first visual cue onto the second modified image stream.

15. The system of claim 13, wherein the electronic processor is further configured to
adjust the first visual cue based on a location of the second portable communication device.

16. The system of claim 11, wherein the electronic processor is further configured to
generate a virtual object of interest based on the object of interest when the object of interest is not detectable within the second modified image stream.

17. The system of claim 16, wherein the electronic processor is further configured to
generate a direction guide indicating the first view angle; and
superimpose the virtual object of interest on the second modified image stream.

18. The system of claim 17, wherein the electronic processor is further configured to
superimpose the virtual object of interest on the second modified image stream based on a location of the first portable communication device and a location of the second portable communication device.

19. The system of claim 18, wherein the electronic processor is further configured to
simulate movement of the virtual object of interest based on at least one selected from a group consisting of a change in the location of the first portable communication device and a change in the location of the second portable communication device.

20. The system of claim 11, wherein the electronic processor is further configured to
display the first modified image stream and the second modified image stream on at least one selected from a group consisting of a computer-aided dispatch terminal, a portable two-way radio, a body-worn camera device, a smart telephone, and a tablet computer.

* * * * *